(No Model.)
T. J. BRAY.
MECHANISM FOR MAKING WAGON BOX STRAPS.
No. 270,176. Patented Jan. 2, 1883.
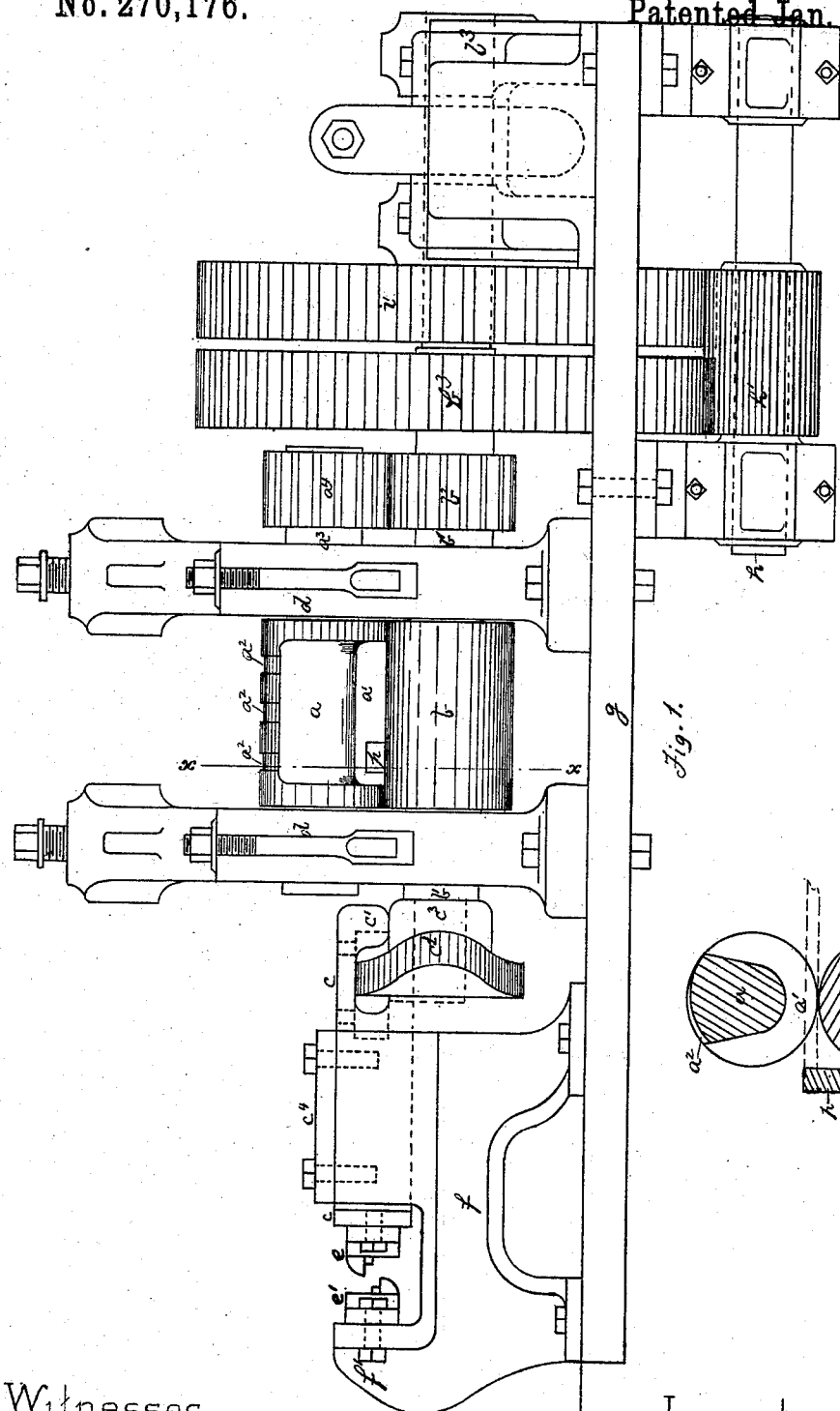
Witnesses
Jno. K. Smith.
L. C. Titler.
Inventor
Thomas J. Bray
by his attys
Bakewell & Kerr

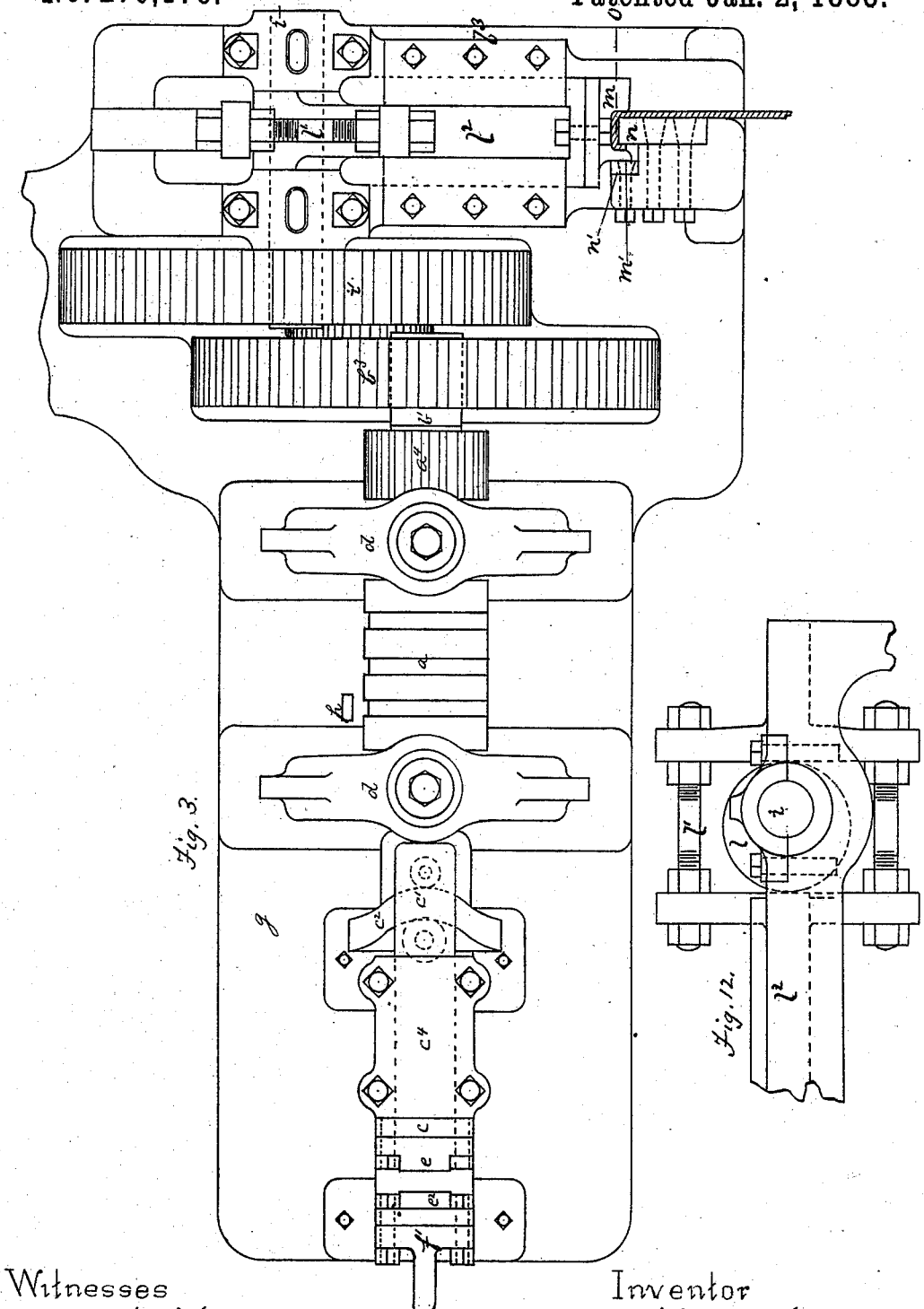

(No Model.)
4 Sheets—Sheet 3.
T. J. BRAY.
MECHANISM FOR MAKING WAGON BOX STRAPS.
No. 270,176. Patented Jan. 2, 1883.
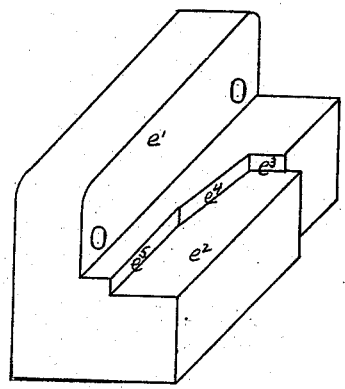
Fig. 4.
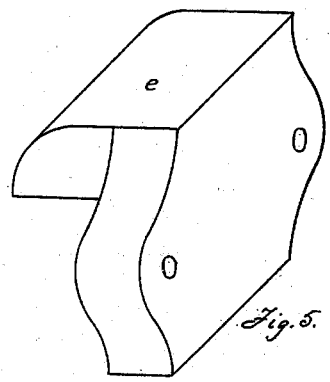
Fig. 5.
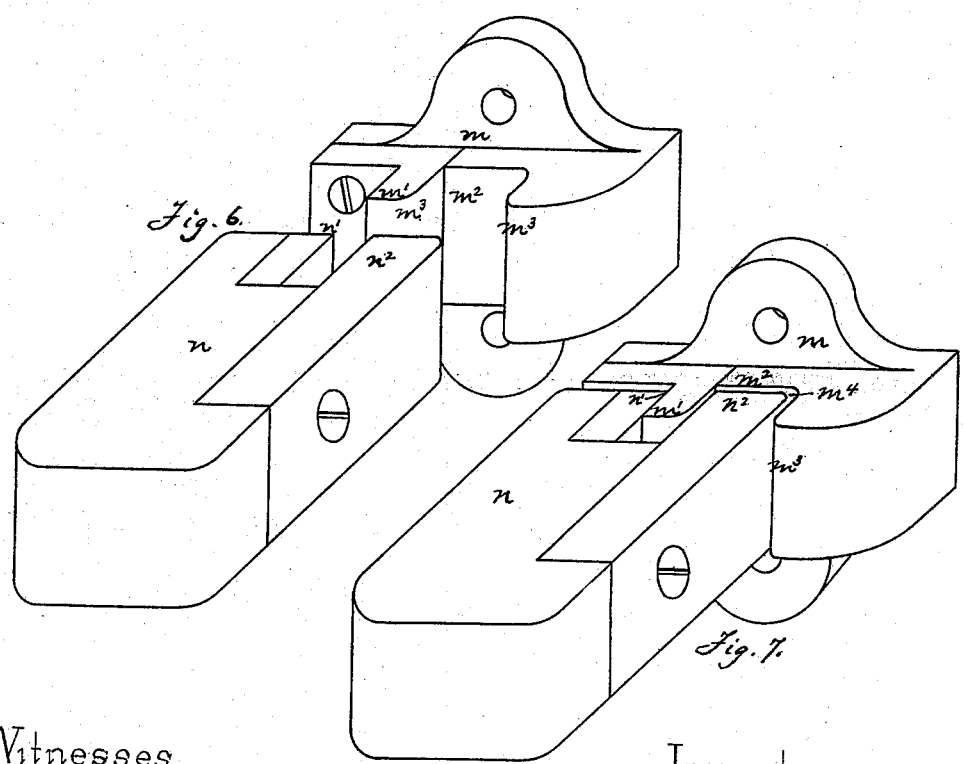
Fig. 6.
Fig. 7.
Witnesses
Jno. K. Smith
L. C. Fitler
Inventor
Thomas J. Bray
by his attys
Bakewell & Kerr (No Model.) 4 Sheets—Sheet 4.
T. J. BRAY.
MECHANISM FOR MAKING WAGON BOX STRAPS.
No. 270,176. Patented Jan. 2, 1883.
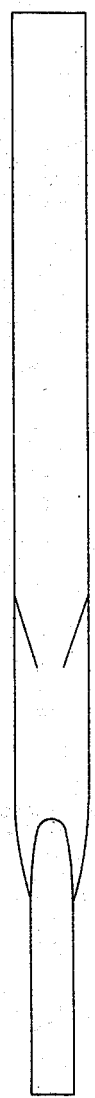
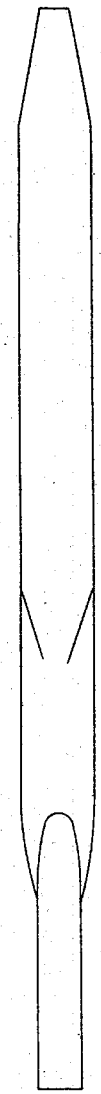
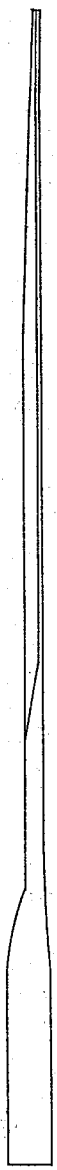
Fig. 8.   Fig. 9.   Fig. 10.   Fig. 11.
Witnesses.
Jno K. Smith
L. C. Fitler
Inventor.
Thomas J. Bray
by his attys
Bakewell & Kerr

UNITED STATES PATENT OFFICE.

THOMAS J. BRAY, OF PITTSBURG, PENNSYLVANIA, ASSIGNOR TO OLIVER BROTHERS & PHILLIPS, OF SAME PLACE.

MECHANISM FOR MAKING WAGON-BOX STRAPS.

SPECIFICATION forming part of Letters Patent No. 270,176, dated January 2, 1883.

Application filed March 28, 1882. (No model.)

*To all whom it may concern:*

Be it known that I, THOMAS J. BRAY, of Pittsburg, in the county of Allegheny and State of Pennsylvania, have invented a new and useful Improvement in Wagon-Box-Strap-Finishing Machines; and I do hereby declare the following to be a full, clear, and exact description thereof.

Heretofore wagon-box straps have been drawn out in rolls, sheared on a separate machine, and then the upper end bent to fit over the top edge of the box by hand. This necessarily involves additional labor, and is a comparatively slow operation. Another objection to the former operation is, that as the straps are drawn out in a grooved roll the reduction of the strap produces a certain amount of lateral spread, which causes the iron to fin and bind in the groove.

The object of the present invention is, first, to put the strap in such a form that when passed through the rolls it will not bind in the groove, and, second, to bend the strap and shear off the ragged end in the same set of dies and at one operation.

To enable others skilled in the art to make and use my invention, I will now describe it with reference to the accompanying drawings, in which—

Figure 1 is a side elevation of the machine. Fig. 2 is a vertical cross-section of the rolls on the line $xx$. Fig. 3 is a plan view. Figs. 4 and 5 are perspective views of the beveling-dies. Fig. 6 is a perspective view of the shearing and bending dies open. Fig. 7 is a perspective view of the same dies closed. Figs. 8, 9, 10, and 11 are views of the strap in various stages of completion. Fig. 12, Sheet 2, is a view of the cam-yoke of the slide.

Like letters of reference indicate like parts in each.

Upon a suitable bed-plate, $g$, is a pair of housings, $d$ $d$, in which are mounted the rolls $a$ $b$. The roll $b$ is a plain roll. The roll $a$ is cut away, as at $a'$, for the insertion of the strap between the rolls against a stop, $p$, on the opposite side. The uncut portion of the roll $a$ is grooved, as at $a^2$, the groove growing shallower until it merges into the periphery of the roll. It will be seen that the bottom of the groove is eccentric to the axis of the roll.

On one end of the shaft $b'$ of the lower roll, $b$, is a head, $c^3$, upon which is a cam, $c^2$.

The frame $f$ is placed upon that end of the bed $g$ which contains the beveling-dies. One beveling-die, $e$, is movable, and is fastened to the end of a reciprocating press, $c$, which is operated by means of a cam-yoke, $c'$, and a cam, $c^2$, and is secured in the frame $f$, in which it slides, by means of a cap, $c^4$. The stationary beveling-die $e'$ is secured to a standard, $f'$, at the other end of the frame $f$, and is placed with relation to the die $e$ so that the end of the strap when placed between the dies shall be compressed thereby.

On the die $e$ is a flat surface, $e^2$, upon which the strap is placed. At the end of the surface $e^2$ is a straight edge, $e^3$, which acts as a stop and limits the insertion of the strap. Back of the flat surface $e^2$ is an oblique side, $e^4$, and a straight side, $e^5$.

The working-face of the die $e$ may be similar in outline to that of the die $e'$ at $e^3$, $e^4$, and $e^5$, or it may have a plain face.

The strap, in the form shown by Fig. 8, is placed on the surface $e^2$ and is subjected to the action of the die $e'$, and is thereby transformed to the shape shown by Fig. 9, the end being tapered and thickened up. Where the oblique face $e^4$ is made on the die $e'$ alone the strap will require to be turned and subjected to two operations of the die $e$.

On the end of the shaft $a^3$ of the roll $a$ is a pinion, $a^4$, which meshes into a pinion, $b^2$, on the shaft $b'$ of the roll $b$, and is driven thereby. On the shaft $b'$, beyond the pinion $b^2$, is a large gear-wheel, $b^3$. Outside of the gear-wheel $b^3$ is a second large gear-wheel, $i'$, which is mounted on the shaft $i$. The gear-wheels $b^3$ and $i'$ are in the same horizontal plane; but the wheel $i'$ is set back of the wheel $b^3$. Below the bed-plate $g$ and in the crotch of the wheels $b^3$ and $i'$ is the power-shaft $h$, which drives the wheels $b^3$ and $i'$ by means of the pinion $h'$, which is mounted thereon. Power is communicated to the shaft $h$ by means of gearing, pulley, clutch, or other suitable device.

On the shaft $i$ is a cam, $l$, which, by mean of a cam-yoke, $l'$, operates a slide, $l^2$, upon ways formed in the frame $l^3$ on one end of the bed of the machine. On the end of the slide $l^2$ is the movable cutting and bending die $m$. Fastened to the frame, in front of the moving die, $m$, is the fixed shearing and bending die $n$. The die $m$ has a knife, $m'$, and a bending cavity or matrix, $m^2$, the jaws $m^3$ of which are rounded, so as to cause the strap to be bent without distortion against a mandrel upon the fixed die $n$. The fixed die $n$ has a knife or cutting edge, $n'$, which, operating in connection with the knife $m'$ of the die $m$, severs the ragged end of the strap. It has a mandrel, $n^2$, which, operating in connection with the matrix $m^2$, bends the strap. When open the dies $m$ and $n$ are sufficiently far apart to permit the feeding of the strap between them and between the knives $m'$ $n'$. When they are closed the knife $m'$, passing the knife $n'$, cuts off the ragged end of the strap, and the die $m$ bends the strap around the mandrel $n^2$, as shown in Fig. 3.

The cavity $m^4$ (shown in Fig. 7) is of the proper width to accommodate the strap when the dies are closed. Thus the operations of trimming and bending the end of the strap are accomplished by one movement of the machine. The bevel communicated to the strap by the beveling-dies is such as to prevent the strap from being transformed into a dovetail shape by the drawing out or rolling operation, and yet thickens up the strap to such an extent that the rolling operation will draw it out to a substantially uniform taper, while preserving the even width throughout the body of the strap back of the tapered extremity or that portion of the strap which has been upset transversely.

If desired, the stop $p$ may be dispensed with; but it is preferable, as it gages exactly the feed required to be given to the strap when put into the rolls.

The operation of the bending and cutting dies is such that it not only leaves the strap in a perfectly-finished condition, ready for its application to the side-boards of the wagon-box, but also bends it without distortion or straining the metal.

What I claim as my invention, and desire to secure by Letters Patent, is—

1. In a wagon-box-strap machine, the combination of die $e'$, having the flat surface $e^2$ and oblique side $e^4$, with the sliding die $e$, said dies being relatively arranged to co-operate in transforming the end of the blank, substantially as specified.

2. In a wagon-box-strap-finishing machine, the combination of the roll $a$, cut away, as at $a'$, and having a groove, $a^2$, whose bottom is eccentric to the axis of said roll, and the roll $b$, having a plain surface arranged to coact with the grooved surface of the first roll, substantially as and for the purpose specified.

3. In a wagon-box-strap-finishing machine, the combination of two rolls cut away or recessed on one side, one of said rolls having on the uncut portion a groove whose bottom is eccentric to the axis of the roll, and a stop for limiting the feed of the strap therein, substantially as and for the purpose specified.

4. In a machine for finishing wagon-box straps, the combination of the die $m$, having the rectangular matrix $m^2$, and knife or cutting edge $m'$, with the die $n$, having the rectangular mandrel $n^2$, and knife or cutting edge $n'$, substantially as and for the purpose specified.

5. The method herein described of finishing wagon-box straps, consisting of the following steps: first, upsetting or compressing the end of the blank transversely, whereby the same is beveled and thickened; secondly, drawing out the blank longitudinally, whereby the blank is tapered uniformly; and, finally, shearing or trimming and bending the blank, substantially as and for the purposes specified.

In testimony whereof I have hereunto set my hand this 27th day of March, A. D. 1882.

THOS. J. BRAY.

Witnesses:
T. B. KERR,
JAMES H. PORTE.